US 6,601,494 B1

(12) United States Patent
Jourdan

(10) Patent No.: US 6,601,494 B1
(45) Date of Patent: Aug. 5, 2003

(54) WIDE SWEEP TILTING MECHANISM FOR A BAND SAW

(75) Inventor: James K. Jourdan, Fond du Lac, WI (US)

(73) Assignee: Armstrong-Blum Mfg. Co., Oshkosh, WI (US)

( * ) Notice: Subject to any disclaimer, the term of this patent is extended or adjusted under 35 U.S.C. 154(b) by 0 days.

(21) Appl. No.: 09/656,540

(22) Filed: Sep. 6, 2000

(51) Int. Cl.[7] .......................... B27B 13/04; B23D 55/08
(52) U.S. Cl. ............................................ 83/811; 83/798
(58) Field of Search ........................ 83/793, 811, 809, 83/812, 813, 798

(56) References Cited

U.S. PATENT DOCUMENTS

| 3,566,731 A | * | 3/1971 | Ensley ...................... 83/201.4 |
| 3,772,951 A | * | 11/1973 | Repetto ...................... 83/174 |
| 3,799,024 A | * | 3/1974 | Alexander .................. 83/799 |
| 3,961,550 A | * | 6/1976 | Oliver et al. ................ 83/574 |
| 4,658,689 A | | 4/1987 | Yakich ........................ 83/801 |
| 4,866,630 A | | 9/1989 | Beaman et al. ........ 364/474.02 |
| 4,922,777 A | * | 5/1990 | Kawabata .................... 83/452 |
| 5,237,897 A | * | 8/1993 | Wijesinghe et al. ........... 83/72 |
| 5,320,016 A | | 6/1994 | Spath et al. ................. 83/801 |
| 5,418,729 A | * | 5/1995 | Holmes ...................... 83/789 |
| 5,819,630 A | * | 10/1998 | Smith ........................ 83/811 |
| 5,878,644 A | | 3/1999 | Jasinski ...................... 83/812 |

OTHER PUBLICATIONS

Brochure entitled "MV Series Band Saws" Armstrong–Blum Mfg Co./Marvel Quality Machines and Blades 1997.

* cited by examiner

Primary Examiner—Charles Goodman
(74) Attorney, Agent, or Firm—David Roche; Baker & McKenzie

(57) ABSTRACT

A mechanism for varying the position of a band saw blade in a tilting frame band saw. The mechanism includes an actuator, a tilt arm and a tilting frame. The actuator is pivotably connected to a support, and the tilt arm is pivotably connected to both the tilting frame and the actuator. The actuator is connected to the tilt arm such that the angular movement of the frame, which results from extension and retraction of the actuator, bears a substantially linear relationship to the stroke of the actuator. The mechanism of the present invention enables the frame to be made with an exceptionally wide sweep, and may be controlled by a proportional hydraulic valve controlled on the basis of location data provided by an encoder mounted within the tilting frame.

12 Claims, 10 Drawing Sheets

WIDE SWEEP TILTING MECHANISM FOR A BAND SAW

BACKGROUND AND SUMMARY OF THE INVENTION

The present invention relates to band saw machines, and in particular, to vertical cut off band saw machines with power tilting.

Vertical band saws with tilting frames and mechanisms and controllers for changing the angle of tilt have been available for a number of years. However, machines of this type are generally limited in the extent to which the frame can be tilted. In particular, tilting frame band saws with automated tilt mechanisms are generally limited to machines in which the maximum degree of tilt is plus or minus 45°. Examples of tilting frame band saws can be seen in U.S. Pat. No. 4,866,630; and in particular, FIG. 5 of the '630 patent. Other examples of band saws with tilting frames can be seen in U.S. Pat. No. 4,658,689 and U.S. Pat. No. 5,878,644. Yet another style of vertical band saw with a hydraulic tilt mechanism can be seen in a brochure published by Armstrong-Blum Manufacturing Co. (copyright 1997) describing the MV Series of Medium Duty Vertical Production Band Saws of that company, the assignee of the present invention. In the MV Series brochure, the hydraulic tilt mechanism is comprised of a pair of cylinder actuators attached directly to the tilting frame which move the frame 45 degrees left and right of vertical.

Prior to the machine of the present invention, vertical band saws with controllable tilting frames were generally limited to tilting the frame a maximum of 45 degrees left and right of vertical. In addition, in machines such as the one described in the '630 patent, the curved rack and pinion arrangement for moving the frame from one tilted position to another is relatively slow, complex and expensive, particularly in instances where there is a large movement of the frame called for by a particular sawing operation or when making a change from one operation to another. The difficulties of rapidly and accurately moving a vertical band saw frame from one position to another is particularly acute when the sweep of the band saw is increased to 60 degrees left and right of vertical.

Yet another example of a tilting frame vertical band saw is shown in U.S. Pat. No. 5,320,016. In the '016 patent, the vertical frame is adjusted by the actuation of a cylinder actuator connected directly to the frame and a stationary support. Indeed, a common method of adjusting the position of a band saw frame in many contexts entails the use of a cylinder actuator directly mounted between the moveable frame and a stationary support. However, when undertaking the large movement associated with a frame capable of moving a frame with wide sweep, i.e., plus and minus 60 degrees from vertical or 120 degrees in total, a number of difficulties arise with the use of a simple hydraulic actuator. An arrangement in which there is a markedly non-linear relationship between the tilt angle of the frame and the displacement of the cylinder would require a complex controller in order to achieve accurate positioning of the frame. A high degree of non-linearity between tilt angle and actuator displacement would require a controller to cause the actuator to undergo varying displacements depending upon the position of the frame. Further, increasing the sweep of tilting frames with typical actuating mechanism is complicated by the varying length of the moment arm associated with the force required to move the frame from one position to another. The varying moment arm, and the resulting need for the application of varying forces, depending upon the angle of the frame, together with the complexity of a having to use an actuator in which different displacements are required, depending upon the location of the frame, have limited the development of band saws with wide sweep tilting.

The machine of the present invention addresses both the need for a tilting frame vertical band saw with a capability of being tilted 60 degrees to the left and right of vertical, and the need to have a mechanism which rapidly and accurately moves the frame from one position to another. The machine of the present invention accomplishes these advantages by the use of a combination of a tilt arm and a tilt drive in which the tilt arm has a first portion slidably connected to a tiltable frame, and a second portion which is pivotably connected to a support. The tilt drive, which may be a cylinder actuator or other drive mechanism, is pivotably mounted to a support and is slideably connected to the tilt arm. The tilt drive is preferably arranged so that the relationship between the degree of movement of the tilting frame and the displacement of the drive is generally linear over the entire sweep, i.e., from negative 60 degrees to positive 60 degrees from vertical.

The foregoing advantages of the present invention will be better understood upon a reading of the following specification and the accompanying drawings.

DETAILED DESCRIPTION OF AN EMBODIMENT OF THE PRESENT INVENTION

Figure 1:
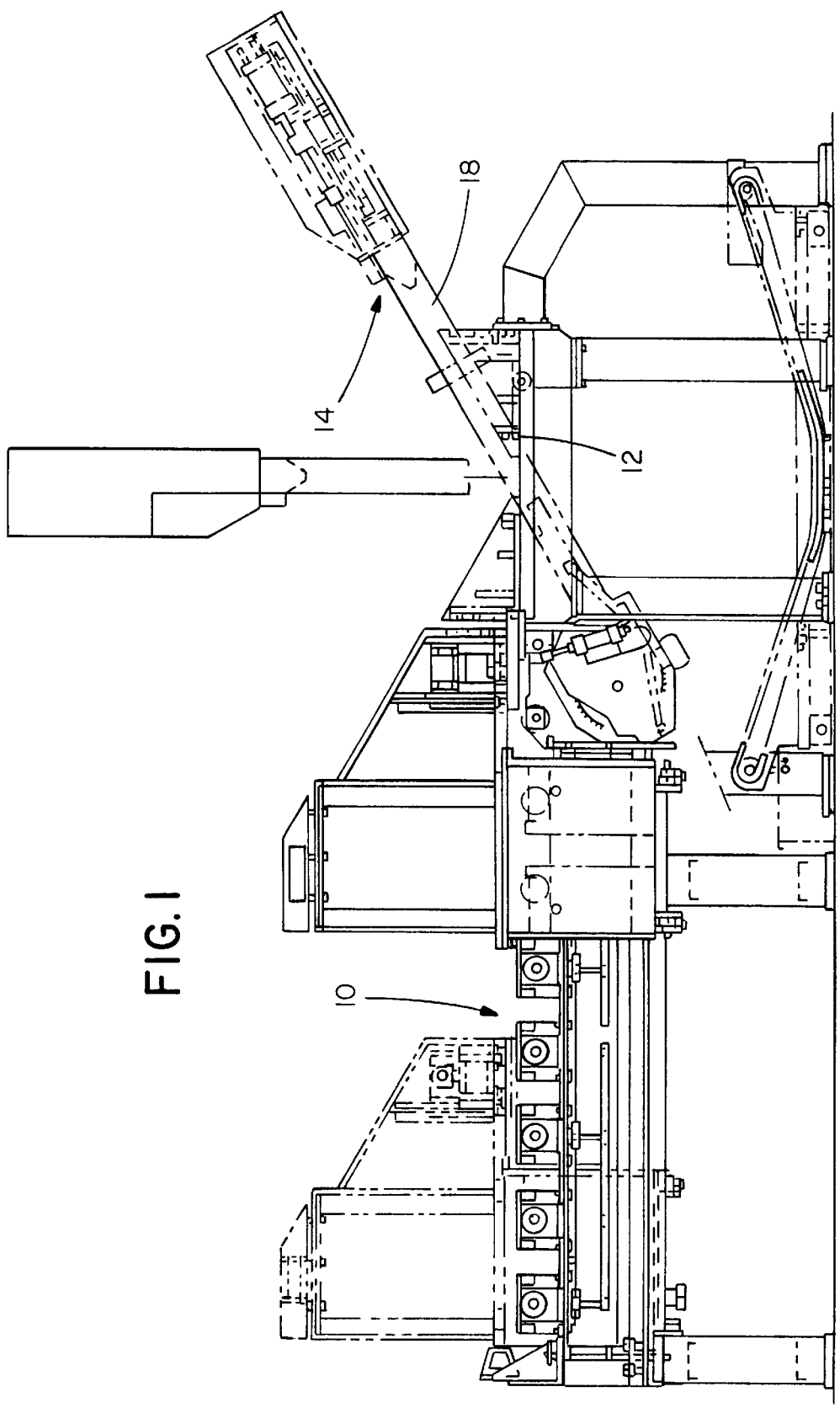
FIG. 1 is a front elevational view of a tilting frame vertical band saw employing the present invention.
Figure 2:
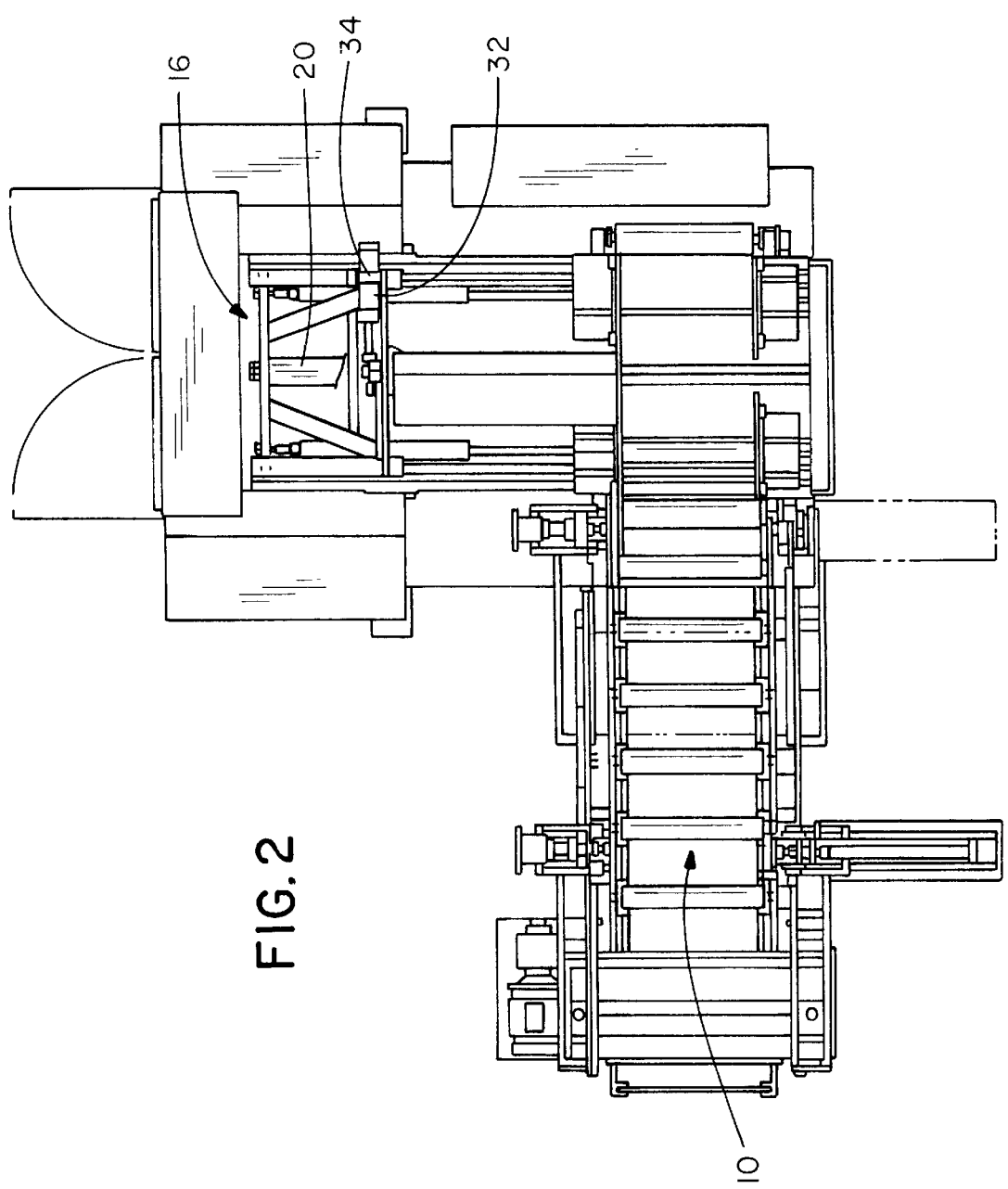
FIG. 2 is a top plan view of a vertical band saw of the present invention.

Referring to FIGS. 1 and 2, a tilting frame band saw machine of the present invention includes a shuttle bar feed table 10 with which work is directed toward the work table 12 behind which the blade carrying frame 14 is mounted. The blade carrying frame 14 is carried by a carriage 16 which moves toward and away from the work table 12.

Figure 3:
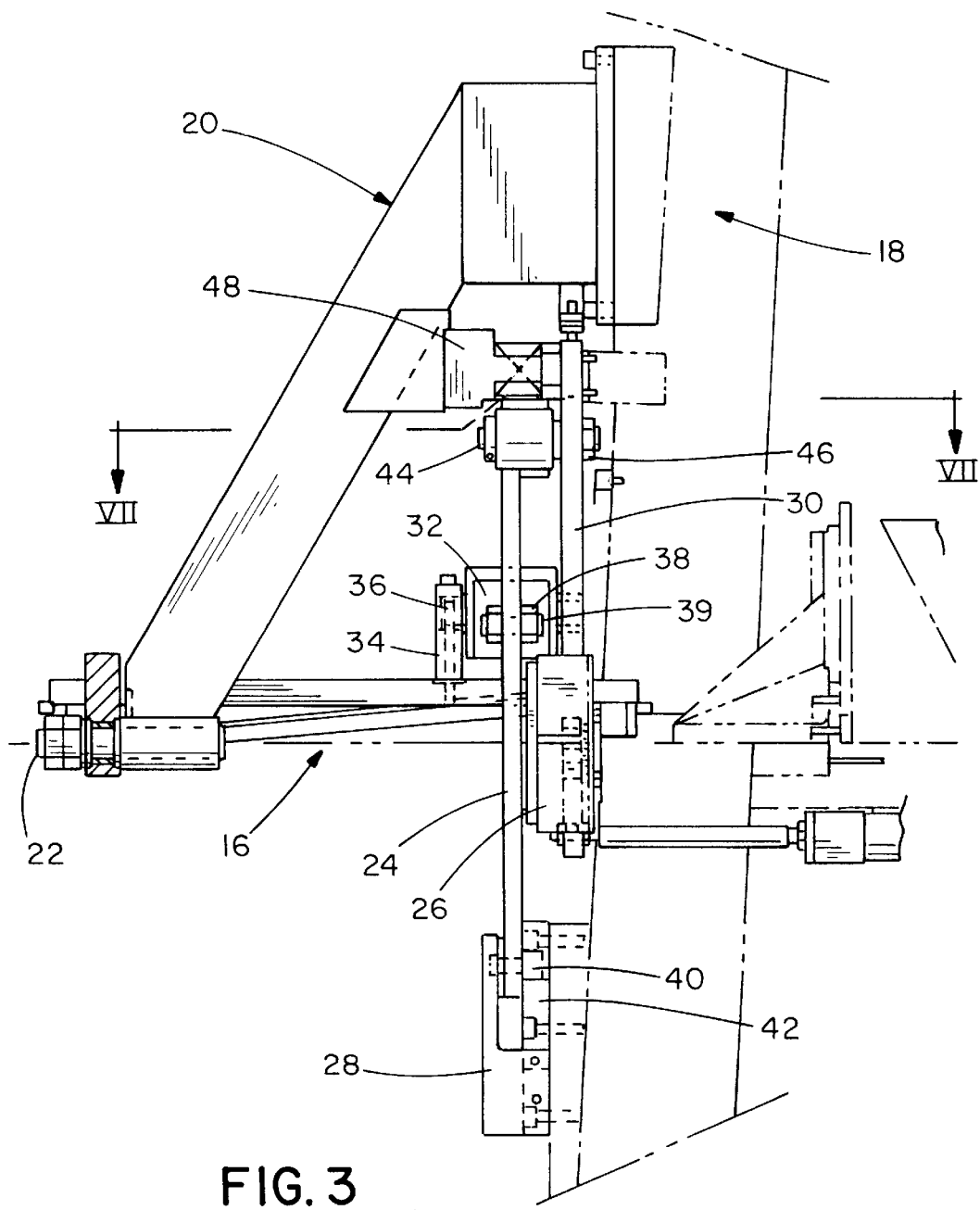
FIG. 3 is a side elevational view of the frame and tilting mechanism of the present invention.

FIG. 3 is a side elevational view of the blade carrying frame 14 and the mechanism used to change the position of the frame. The frame 14 includes a main column 18 (shown in dotted lines) supported from the rear (i.e., from the left in FIG. 3) by a strut 20. The lower portion of the strut 20 is supported on a rear pivot 22. A main pivot bearing 26 is attached to the column 18. A plate 30 extends across the carriage 16 and acts as a support for the operation of the tilting mechanism, which includes a tilt arm 24, a tilt arm retainer 28, and an actuator 32. The actuator 32 is mounted to a support 34 and a plate 30 for the actuator 32. A clevis 38 in combination with a pin 39 connect one end of the actuator 32 to the tilt arm 24. The upper portion of the tilt arm 24 is pivotably connected to the plate 30 by a shaft 44 (supported by bearings not shown) and a nut 46.

A brake 48 is mounted to the strut 20 and the column 18; the brake 48 is used to hold the frame 14 in a fixed position by clamping the plate 30, once a final position for the frame has been achieved by operation of the actuator 32. The lower portion of the tilt arm 24 is slidably connected to the column 18 by the cam guide 42. A cam roller 40 is mounted to the lower end of the tilt arm 24 and slides in a slot within the cam guide 42. The cam guide 42 is fixedly attached to the lower portion of the column 18. The tilt retainer acts as a safety device to make sure that the cam roller 40 does not disengage from the slot in the cam guide 42.

Figure 4:
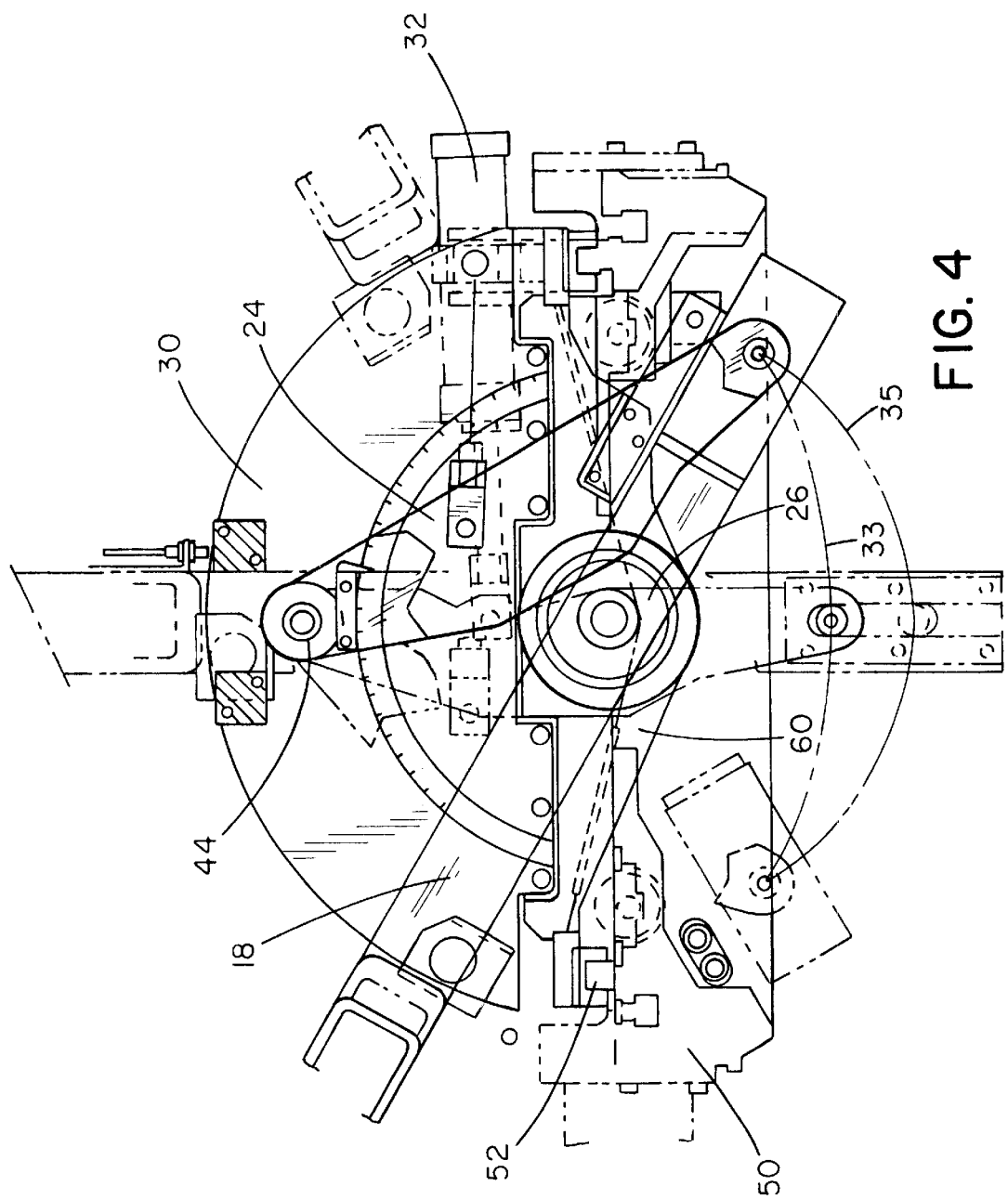
FIG. 4 is a front elevational view of the tilting frame mechanism of the present invention showing the frame tilted fully to the left position.
Figure 5:
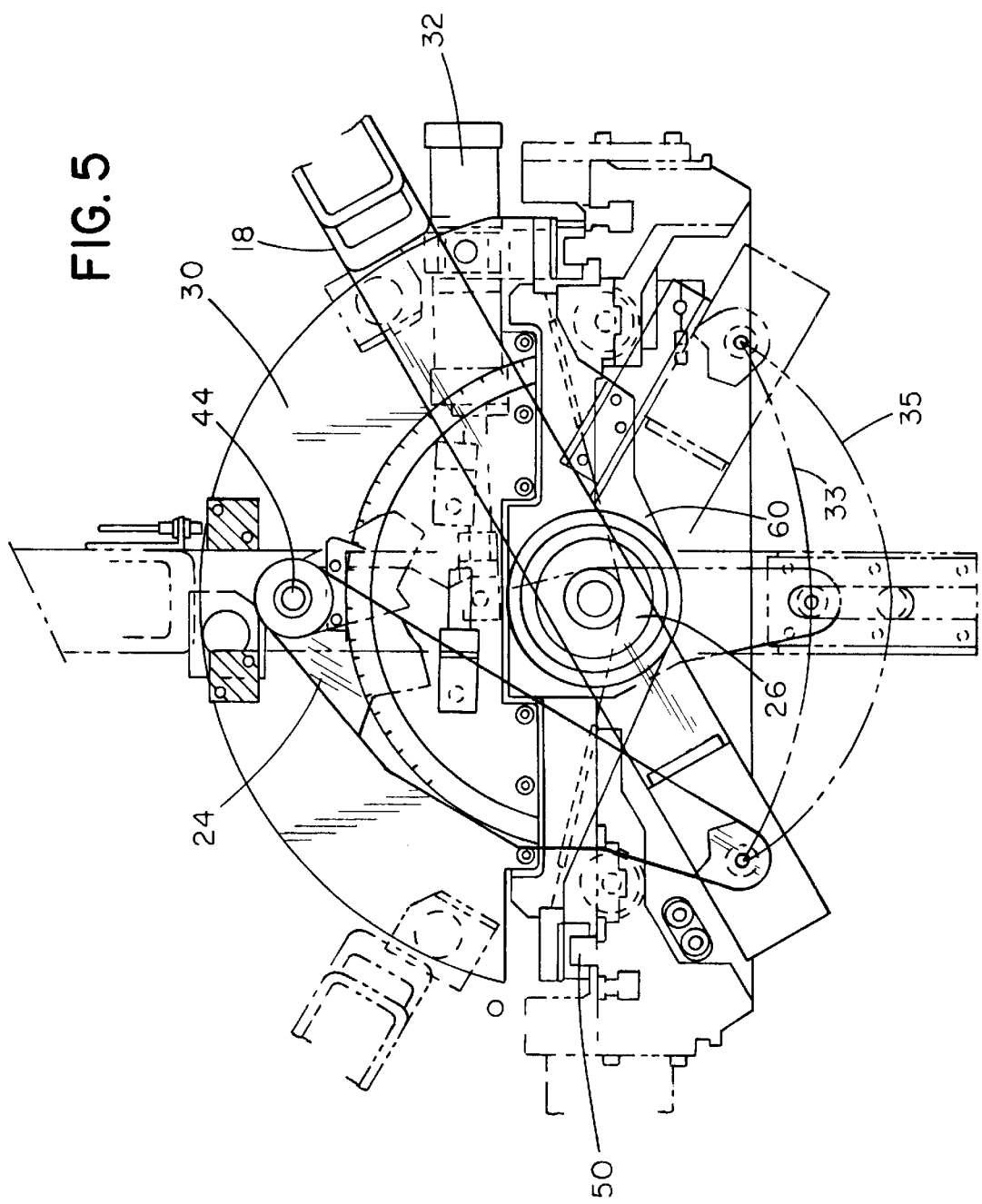
FIG. 5 is a front elevational view of the tilting frame mechanism of the present invention showing the frame tilted fully to the right position.
Figure 6:
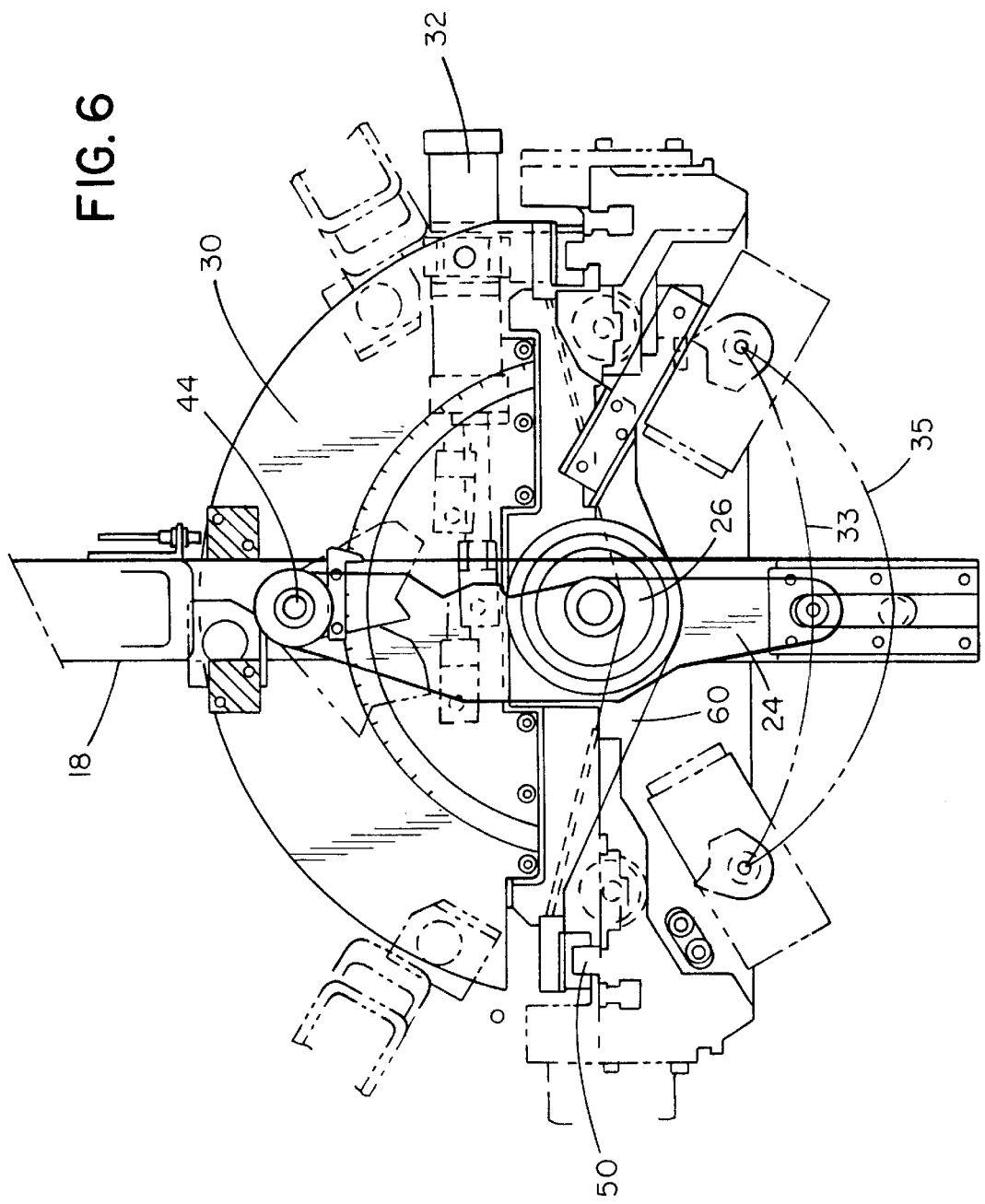
FIG. 6 is a front elevational view of the tilting frame mechanism of the present invention with the frame in the vertical position.

FIGS. 4, 5 and 6 are a series of drawings which show the wide sweep of the tilt arm of the present invention. FIG. 4 shows the column 18 in a position fully tilted to the left. To achieve the position shown in FIG. 4, the actuator 32 is fully retracted, which causes the tilt arm 24 to move to the right. This, in turn, causes the frame 14, including the column 18 and strut 20, to move the left. As the tilt arm 24 shown in FIG. 4 is caused to move in the counter-clockwise direction around the shaft 44 by retraction of the actuator 32, the column 18 pivots in a counter-clockwise direction around the main tilt pivot bearing 26 to the position shown in FIG. 4.

As the frame 14 moves from the position shown in FIG. 4 to the position shown in FIG. 5, the actuator 32 is extended outwardly causing a clockwise movement of the tilt arm 24 around the shaft 44 and, at the same time, a clockwise motion of the frame 14 occurs around the main tilt pivot bearing 26, and the frame 14 moves to the position shown in FIG. 5.

To move the frame 14 from the position shown in FIG. 5 to the position shown in FIG. 6, the actuator 32 is partially retracted. This causes a counter-clockwise rotation of the tilt arm 24 about the shaft 44, and a counter-clockwise rotation of the frame 14 about the main pivot bearing 26.

In FIGS. 4, 5 and 6, the line 33 represents the path taken by swinging lower end of the tilt arm 24 as the actuator applies forces thereto, while the line 35 represent the path taken by a point on the column 18. The upper end of the tilt arm 24 is pivotably attached by the shaft 44 to the support plate 30 about which the frame 14 (i.e., the assembly formed by the column 18 and strut 20) tilts.

Figure 7:
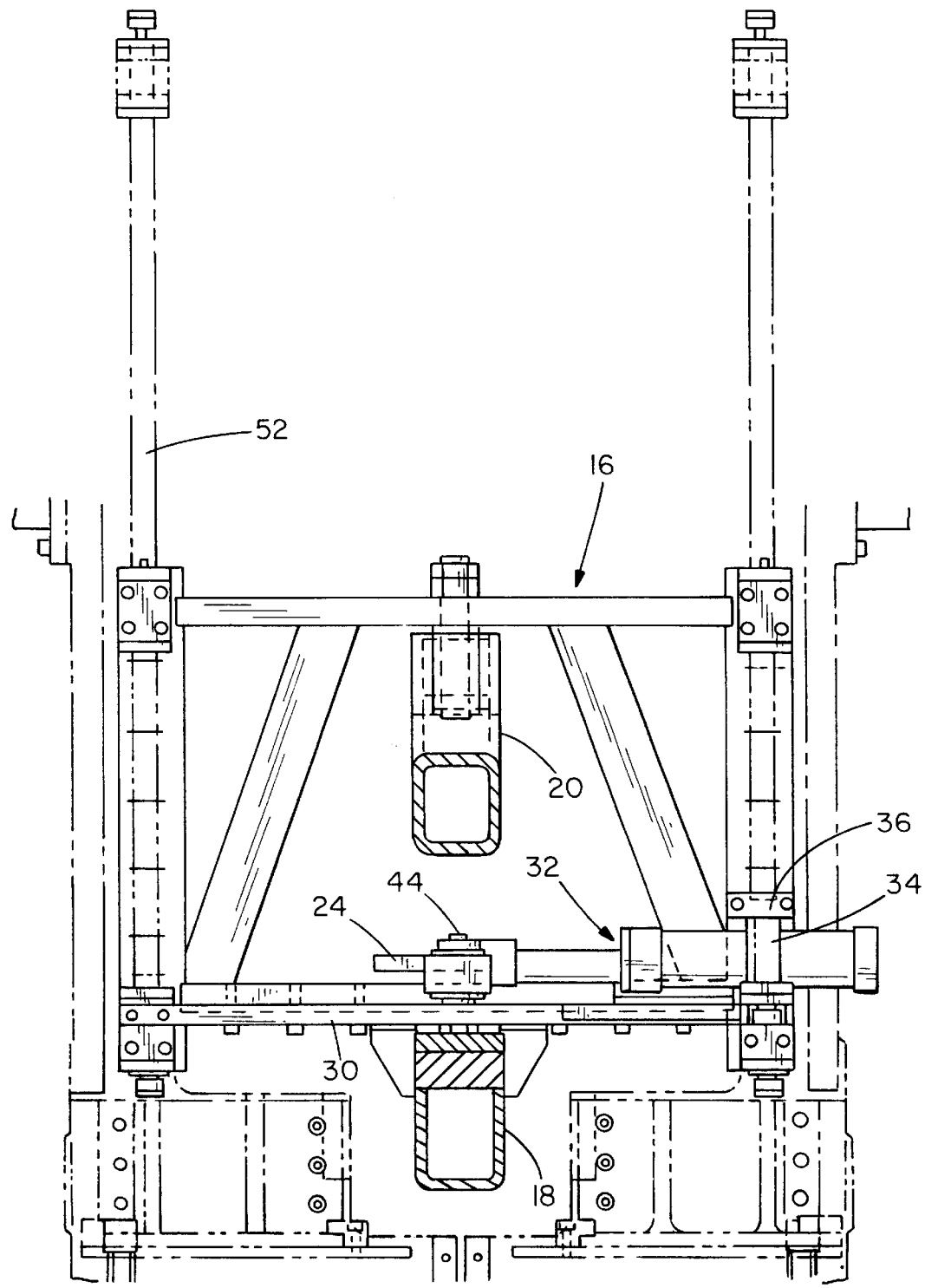
FIG. 7 is a sectional view looking down along line VII—VII of FIG. 3.

FIG. 7 is a sectional view looking downward on the carriage 16 which supports the frame 14. The carriage 16 rides along tracks 52 toward and away from the work table 12, as a workpiece is being operated upon by the blade carried by the frame 14. The actuator 32 pivots in a plane perpendicular to the plane of FIG. 7 about a support 34, which includes a mounting block 35, a gripping band 37 with pivot pins 36 and plate 30. The body of the actuator 32 is free to pivot in the support 34 as the actuator is extended and retracted.

Figure 8:
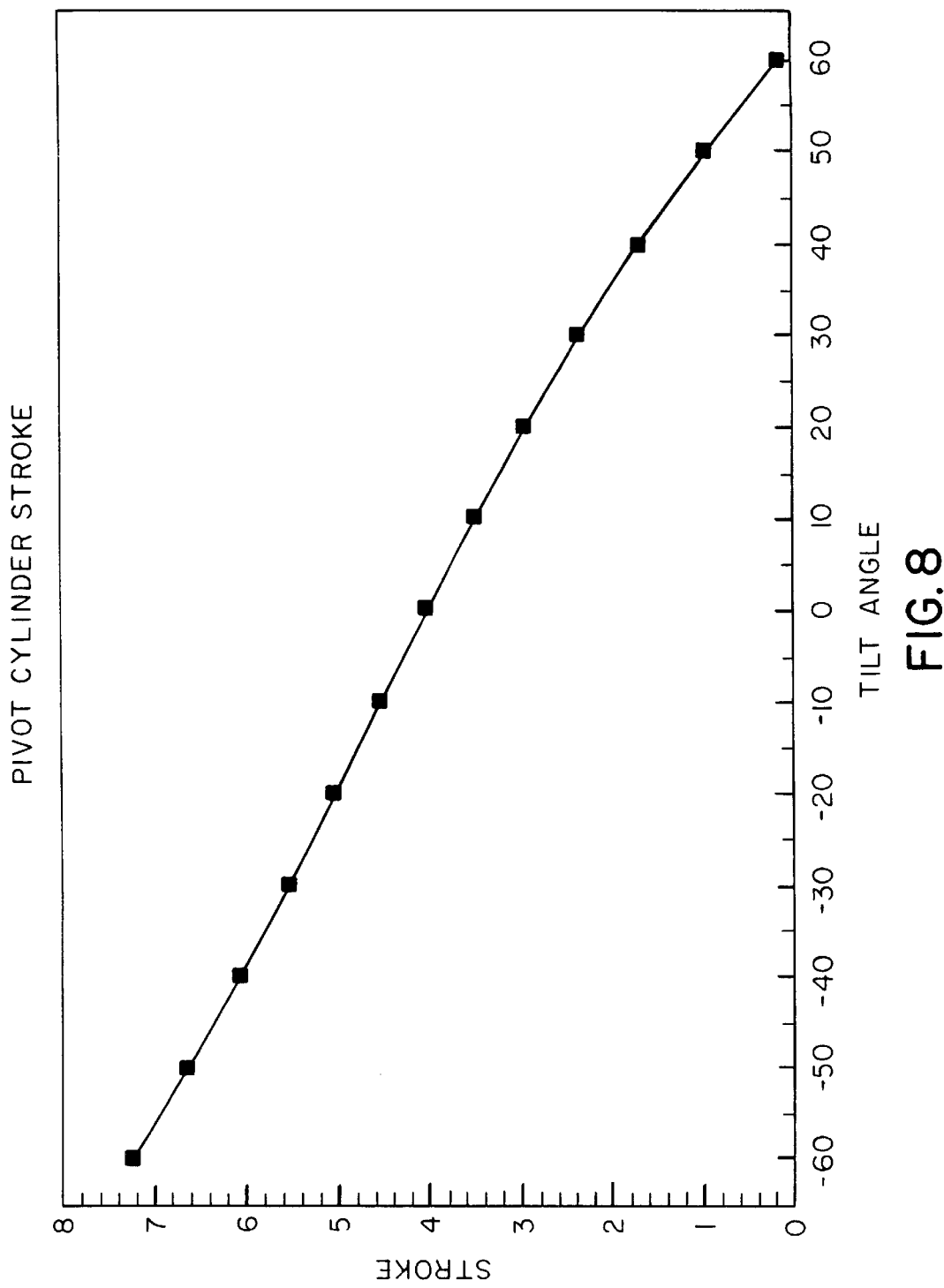
FIG. 8 is a graph showing the generally linear relationship between the stroke of the tilt drive cylinder actuator on the Y-axis and the tilt angle along the X-axis.

FIG. 8 is a plot of the tilt angle of the frame 14 (x-axis) versus the displacement of the actuator 32 (y-axis). This plot shows the generally linear relationship over the entire sweep from negative 60 degrees to positive 60 degrees between the displacement or stoke of the actuator and the tilt angle of the frame resulting from such displacement. In the plot shown in FIG. 8, the y-axis represents the extent to which the rod in the tilt arm actuator 32 extends from the body of the actuator 32, i.e., the change in distance between the support 34 and the pin 39. The arrangement of the tilt arm 24 and the tilt arm actuator 32, as depicted in FIGS. 4, 5 and 6, results in a nearly or approximately linear relationship between the stroke of the actuator and the tilt angle of the frame. This relationship provides a distinct advantage in the control of the position of the frame 14. Control of the movement of the frame is simplified by the approximately linear relationship.

Figure 9:
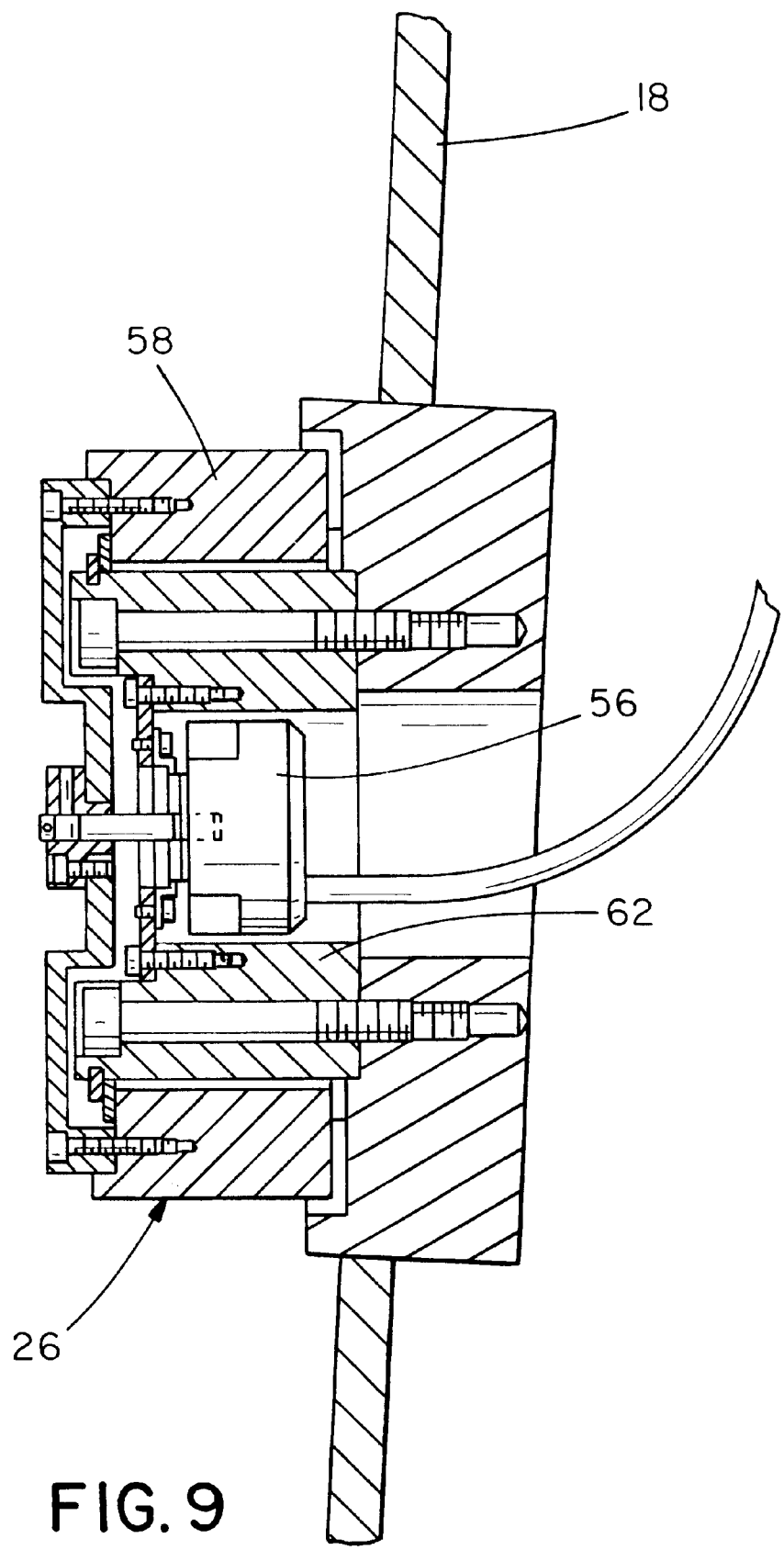
FIG. 9 is a sectional view of the central bearing and support column of the present invention.

The control of the frame is achieved by the operation of a directional control valve, in combination with a programmable or motion controller. Alternatively, however, the rotating movement of the frame may be controlled by a simple two-speed hydraulic circuit. Information regarding the position of the frame is generated by an encoder 56 housed within the main tilt pivot bearing 26. As can be seen in FIG. 9, the outside part 58 of the bearing 26 is mounted in a non-rotatable manner to a horizontal carriage arm 60 (See FIGS. 4–6). The encoder is mounted to the stationary inner part 62 of the bearing 26. As the column 18 moves relative to the carriage 16, a signal with position information is sent to a controller. The controller receives the position information from the encoder 56 and based upon instructions from an operator regarding a new desired position, the controller calculates a theoretical motion profile.

If a proportioned valve is used to facilitate the calculation of a motion profile, the sweep of the tilting frame is divided into a plurality of segments or zones based upon both angle and direction of motion. Thus, for example, the 120 degree sweep may be divided into twelve zones of 20 degrees each, six clockwise zones and six counter-clockwise zones (1+, 1−, 2+, 2− etc.). For each zone a set of motion parameter data is developed in a setup or self-teaching routine. The motion parameters (which may also be adjusted manually) for each zone preferably includes the following:

Brake disengage delay

Brake engage delay

Coast distance (counts)

Deadband (counts)

Acceleration slope

Deceleration slope

End of move constant velocity

Overshoot return voltage

Startup breakaway—all zones

Startup maximum speed—all zones

Figure 10:
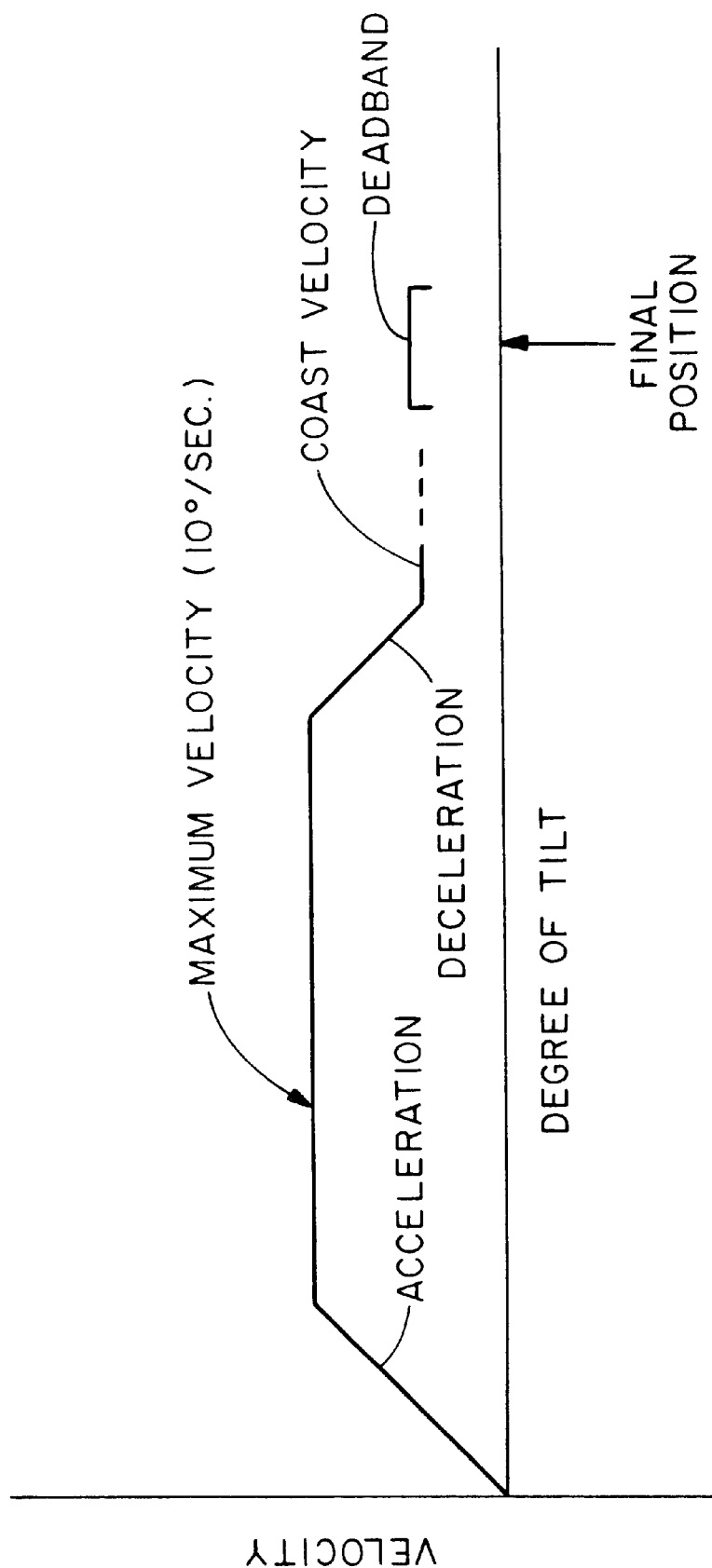
FIG. 10 is a graph showing the profile of the acceleration, velocity and deceleration of the tilting frame of the present invention.

The first step in changing the position of the frame is to determine the direction and magnitude of the move. Then, the zones of operation involved in the move are identified. Based on the zones involved in a move, a theoretical motion profile is calculated and loaded into the controller, such as the one commercially available from J.R. Kerr. The motion controller is then enabled. FIG. 10 is an example of a motion profile, i.e. angular velocity is on the y-axis and angular position of the frame is on the x-axis. Acceleration rates, maximum velocities, deceleration rates and coast values are selected based upon the parameters of each zone. Once the profile is generated, the brake which holds the frame is released, and the motion is executed based on the profile. The position of the frame is checked to see if it is within tolerance. If a correction is needed, a correction is executed.

Once the final desired position is achieved, the brake is engaged, and the JR Kerr board is disabled. The controller is preferably set so that if the final desired position is not achieved with a maximum of three corrections, the brake is engaged, the JR Kerr board is disabled, and the sawing sequence is interrupted and an error message is displayed on a screen visible to the operator.

In most moves the motion profile will be trapezoidal, as shown in FIG. 10, the trapezoid being comprised of an acceleration distance, a constant velocity distance, a deceleration distance, a coast distance and a deadband distance. However, in some instances, the profile may be triangular, for example where the move is relatively small. If an overshoot occurs, the controller will need to use the parameters of the reverse direction for the zone in which the frame is located.

The breakaway parameters for each zone are set as follows:

1. The operator starts the process by manually moving the frame to the vertical position, using default values.
2. The brake is then disengaged.
3. The valve command is set to 0.
4. The valve is set for positive motion, and the pressure delivered by the proportional valve is slowly increased until motion is detected by the encoder. This value is set as the breakaway value for zone 3+ (the zone adjacent to the vertical position).
5. The frame is allowed to move to the +20 degree position at which time the valve is set to zero output.
6. The valve is set to cause a negative movement, and the valve is slowly opened until motion is detected by the encoder. This value is the breakaway value for zone 3−.
7. The frame is returned to the +20 degree position, and the valve is set to zero output.
8. The valve is set for positive motion, and the valve is slowly opened until motion is detected by the encoder, the voltage at which motion is detected is set as the breakaway value for the next zone, i.e., zone 4+.
9. This procedure is repeated until a breakaway for all twelve zones is set.

The following procedure is usable to obtain maximum speed parameters for each zone;

1. Manually move the frame to the fully tilted negative position, i.e. −60 degrees.
2. Instruct movement to the +58 degree position.
3. Set the valve output to the breakaway setting plus 1 volt.
4. Use the encoder output to calculate the actual velocity achieved in each of the six zones as the frame moves from the −60 to the +58 position.
5. Instruct movement to the −58 degree position.
6. Set the valve output to the breakaway setting plus 1 volt.
7. Use the encoder output to calculate the actual velocity achieved in each of the six zones as the frame moves from the +58 position to the −58 position.

The first approximation is that 1 volt applied to the valve achieves a certain number of degrees per second in tilt velocity. Comparing the measured velocity to the desired maximum velocity in each zone, the operator can adjust the output applied to the valve on a zone-by-zone basis until the desired maximum velocity is achieved. The test sweeps should be run repeatedly until the correct maximum velocity is achieved in each zone. The proportional valve is preferably a Wandfluh proportional hydraulic directional control valve, which is set to cause motion of the frame of 10 degrees per second when voltage is applied to the valve. The amount of voltage needed to achieve such speed will vary depending upon the position of the frame and the desired direction of movement.

While the actuator shown herein is a hydraulic cylinder, it should be noted that other actuating means may be employed to move the tilt arm and the frame of the machine of the present invention. For example, an externally threaded lead screw may be connected between a support and the tilt arm and the lead screw may be coupled to an internally threaded member, rotation of which causes extension of the lead screw from the internally threaded member resulting in displacement of the tilt arm in one rotational direction or another, depending upon the direction of rotation of the internally threaded member. Similarly, a worm gear engaging a rack connected to the tilt arm could be used to move the tilt arm.

The present invention has been described by reference to one example, which is presently considered to be the most practical and preferred embodiment. However, it is important to understand that the invention is not limited to the disclosed description, but on the contrary, is intended to cover various modifications and equivalent arrangements included within the spirit and scope of the appended claims.

What is claimed is:

1. A mechanism for varying the angular position of a frame in a tilting-frame cut-off band saw comprising:
    a frame carrying a band saw blade and a motor for moving said blade relative to a workpiece, said frame, blade and motor being movable together toward and away from said workpiece, and said frame being pivotable about a frame axis,
    a tilt arm connected to said frame and adapted to move said frame about said frame axis, said tilt arm having a first portion slidably connected to said frame and a second portion pivotably connected to a fixed support,
    a tilt arm drive adapted to move said tilt arm about said fixed support, said tilt arm drive having a fixed and pivotable end and a second end connected to said tilt arm at a location on said tilt arm between opposite ends of said tilt arm.

2. A mechanism in accordance with claim 1 wherein said tilt arm drive is a cylinder actuator including rod and piston slidably mounted within a cylinder, said cylinder being pivotably mounted to said support and said rod being pivotably attached to said tilt arm.

3. A mechanism in accordance with claim 1 wherein said tilt arm drive is an actuator including externally threaded lead screw, and relative rotation of said threaded lead screw and an internally threaded member causes extension of said actuator and displacement of said tilt arm.

4. A mechanism in accordance with claim 1 wherein said tilt arm drive is attached to said support and to said tilt arm such that there is a substantially constant relationship between the number of degrees of rotation of said frame and axial displacement of said tilt arm drive during movement of said frame between positions of maximum tilt.

5. A mechanism in accordance with claim 1 wherein said first portion of said tilt arm carries a cam roller and said frame carries a tilt arm guide and a slot, said cam roller fitting into said slot, and said second portion is connected by a pivot shaft to said support.

6. A mechanism in accordance with claim 1 wherein said support includes a pair of tracks and a bridge spanning said tracks, an arched brake plate carried by said bridge, and said pivot shaft being connected to said brake plate.

7. A tilting-frame band saw comprising a pivoting frame, said frame being moveable about a tilt axis to locations between two extreme fully tilted positions in which said frame is fully tilted in opposite first and second directions, respectively, a mechanism for moving said frame to said locations, said mechanism including a support, a tilt arm connected to said frame and adapted to move said frame about said tilt axis, said tilt arm having a first portion slidably connected to said frame and a second portion pivotably connected to a fixed support, and a tilt arm drive adapted to move said tilt arm about said fixed support, said tilt arm drive having a fixed and pivotable end and a second end connected to said tilt arm at a location on said tilt arm between opposite ends of said tilt arm.

8. A tilting-frame band saw in accordance with claim 7 wherein said extreme fully tilted positions define an included angle of about 120°.

9. A tilting-frame band saw in accordance with claim 7 wherein said tilt arm drive is a cylinder actuator including rod and piston slidably mounted within a cylinder, said cylinder being pivotably mounted to said support and said rod being pivotably attached to said tilt arm.

10. A tilting-frame band saw in accordance with claim 7 wherein said tilt arm drive is attached to said support and to said tilt arm such that there is a substantially constant relationship between the number of degrees of rotation of said frame and axial displacement of said tilt arm drive during movement of said frame between said extreme fully tilted positions.

11. A tilting-frame band saw in accordance with claim 7 wherein said first portion of said tilt arm carries a cam roller and said frame carries a tilt arm guide and a slot, said cam roller fitting into said slot, and said second portion is connected by a pivot shaft to said support.

12. A tilting-frame band saw in accordance with claim 7 wherein said support includes a pair of tracks and a bridge spanning said tracks, an arched brake plate carried by said bridge, and said pivot shaft being connected to said brake plate.

* * * * *